United States Patent [19]
Sone

[11] Patent Number: 5,835,307
[45] Date of Patent: Nov. 10, 1998

[54] MAGNETIC DISK UNIT HAVING BENT SPRING ARM

[75] Inventor: Katsuhide Sone, Kawasaki, Japan

[73] Assignee: Fujitsu Limited, Kawasaki, Japan

[21] Appl. No.: 621,548

[22] Filed: Mar. 25, 1996

Related U.S. Application Data

[63] Continuation of Ser. No. 353,145, Dec. 9, 1994, abandoned, which is a continuation of Ser. No. 141,346, Oct. 22, 1993, abandoned.

[30] Foreign Application Priority Data

Oct. 28, 1992  [JP]  Japan .................................. 4-289942

[51] Int. Cl.⁶ .................................................. G11B 5/48
[52] U.S. Cl. ............................................................ 360/104
[58] Field of Search ................................ 360/104, 105, 360/106

[56] References Cited

U.S. PATENT DOCUMENTS

| | | | |
|---|---|---|---|
| 4,943,875 | 7/1990 | Reidenbach et al. | 360/104 |
| 4,947,275 | 8/1990 | Hinlein | 360/104 |
| 5,065,268 | 11/1991 | Hagen | 360/104 |
| 5,099,373 | 3/1992 | Shibata et al. | 360/104 |
| 5,198,945 | 3/1993 | Blaeser et al. | 360/104 |
| 5,201,458 | 4/1993 | Hagen | 360/104 |
| 5,313,353 | 5/1994 | Kohso et al. | 360/104 |
| 5,383,073 | 1/1995 | Masukawa et al. | 360/104 |
| 5,434,731 | 7/1995 | Hagen | 360/104 |
| 5,579,190 | 11/1996 | Mastache et al. | 360/106 |

FOREIGN PATENT DOCUMENTS

| | | |
|---|---|---|
| 62-149087 | 7/1987 | Japan . |
| 1-220278 | 9/1989 | Japan . |

*Primary Examiner*—Stuart S. Levy
*Assistant Examiner*—William R. Korzuch
*Attorney, Agent, or Firm*—Greer, Burns & Crain, Ltd.

[57] ABSTRACT

A magnetic disk unit having a head suspension mechanism which can reduce the flying height of a slider and can stably fly the slider. The head suspension mechanism includes a spring arm having one end portion for supporting the slider so that when a magnetic disk is at rest, the slider is kept in contact with the magnetic disk, while when the magnetic disk is rotated, the slider is moved to fly from the magnetic disk by dynamic pressure due to air flow caused by rotation of the magnetic disk. The spring arm has a bent portion formed so that a transducer mounted on the slider approaches the magnetic disk.

8 Claims, 7 Drawing Sheets

MAGNETIC DISK UNIT HAVING BENT SPRING ARM

This is a continuation of application Ser. No. 08/335,145 filed on Dec. 9, 1994, now abandoned, which is a continuation of application Ser. No. 08/141,346 filed on Oct. 22, 1993, now abandoned.

BACKGROUND OF THE INVENTION

1. Field of the Invention

The present invention relates to a magnetic disk unit capable of reducing the flying height of a magnetic head slider from a magnetic disk surface.

2. Description of the Related Art

A reduction in size and an enlargement in capacity of a magnetic disk unit as a kind of external computer storage have recently been desired. One of the methods for effecting the enlargement in capacity of the magnetic disk unit is to increase the number of magnetic disks mounted on a spindle. In association with the increase in the number of magnetic disks, the packing space between the magnetic disks in a recent magnetic disk unit has been reduced.

In general, the magnetic disk unit includes a spindle adapted to be rotationally driven, a plurality of magnetic disks mounted on the spindle and arranged at fixed intervals, a plurality of magnetic head sliders having transducers for writing data onto the magnetic disks and reading data recorded on the magnetic disks, a plurality of spring arms spaced from each other for supporting the magnetic head sliders thereon, respectively, and a carriage for movably supporting the spring arms.

It is known that a magnetic disk unit for computers employs a flying magnetic head slider, so as to avoid damage due to contact with a magnetic disk. In such a magnetic disk unit employing a flying magnetic head slider, rotation of the magnetic disk at a high speed (e.g., 4,500 rpm) generates an air flow to fly the magnetic head slider. A flying force applied to the magnetic head slider is balanced with a spring force applied to the magnetic head slider to thereby maintain a fine spacing (about 0.1 to 0.2 $\mu$m) between the magnetic head slider and the magnetic disk, thus writing data onto the magnetic disk and reading data from the magnetic disk. In this type of magnetic disk unit, the distance between the magnetic head slider and the magnetic disk has a large influence upon the performance of reading and writing data. During the rotation of the magnetic disk by the operation of the magnetic disk unit, the peripheral speed of the magnetic disk increases from the inner circumference to the outer circumference of the magnetic disk, and the flying distance between the magnetic head slider and the surface of the magnetic disk is therefore increased from the inner circumferential portion to the outer circumferential portion of the magnetic disk.

It is well known in the art to reduce the flying height of the magnetic head slider, so as to improve the electromagnetic characteristics of the magnetic disk. Various trials such as modifying the shape of the slider or reducing the biasing force of the spring arm supporting the slider have been made, so as to reduce the flying height of the slider and stably fly the slider. The modification of the shape of the slider is effective for improvement in static flying characteristics; however, the size of rails provided on the slider must be finely modified, so as to reduce the absolute value of the flying height. On the other hand, the reduction in the biasing force of the spring arm supporting the slider may possibly cause head crash in seeking.

SUMMARY OF THE INVENTION

It is therefore an object of the present invention to provide a magnetic disk unit having a head suspension mechanism which can reduce the flying height of the slider and can stably fly the slider.

In accordance with an aspect of the present invention, there is provided a magnetic disk unit comprising a housing having a base and a cover; a magnetic disk rotatably mounted in said housing and having a plurality of circular tracks; a magnetic head slider for supporting a transducer in proximity to said rotating magnetic disk, said transducer performing read/write of data from/to said magnetic disk; a spring arm having one end portion for supporting said slider, a leaf spring portion provided in the vicinity of the other end portion for biasing said slider toward said magnetic disk and a bent portion formed so that said transducer mounted on said slider approaches said magnetic disk; and carriage means connected to the other end portion of said spring arm for moving said slider supported to said spring arm in a direction crossing the tracks of said magnetic disk.

According to the present invention, the spring arm is bent in such a direction that the transducer mounted on the slider approaches the magnetic disk, thereby reducing the absolute value of the flying height of the magnetic disk and maintaining a good flying stability.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
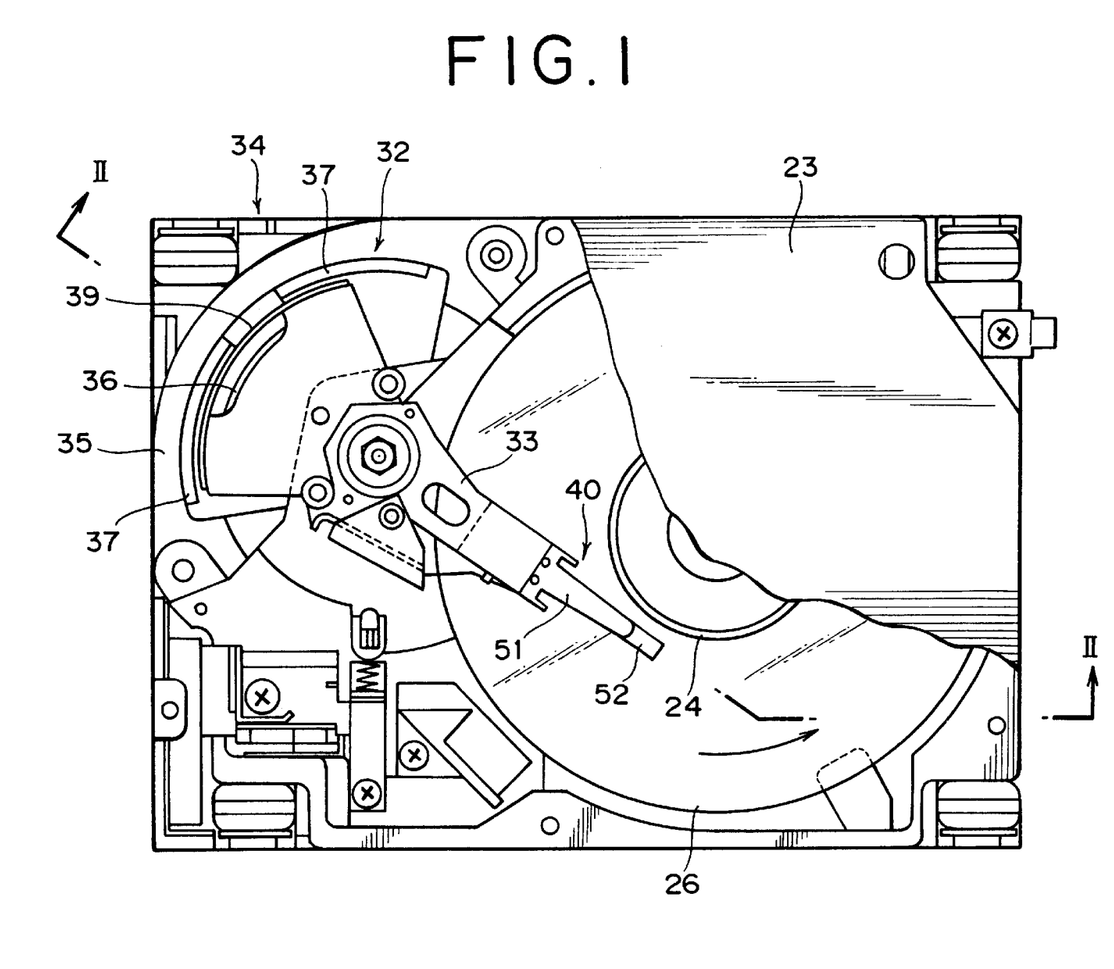
FIG. 1 is a partially cutaway plan view of a magnetic disk unit having a head suspension mechanism according to the present invention.
Figure 2:
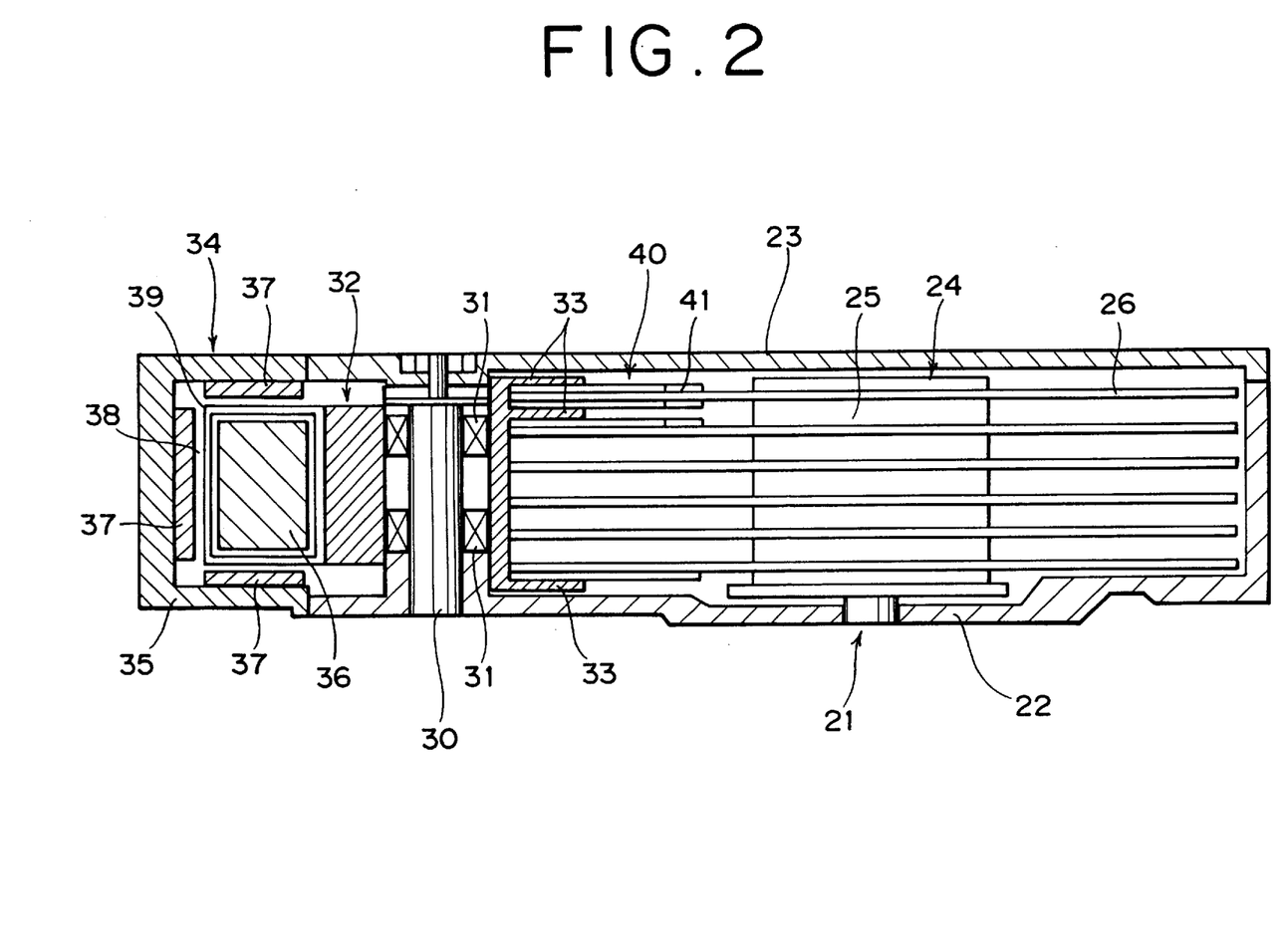
FIG. 2 is a cross section taken along the line II—II in FIG. 1.

Referring first to FIGS. 1 and 2, reference numeral 21 denotes a housing (enclosure) constructed of a base 22 and a cover 23. A spindle hub 24 to be rotationally driven by an inner hub motor (not shown) is provided on the base 22. A plurality of annular magnetic disks 26 and a plurality of annular spacers 25 are alternately stacked and disposed around the spindle hub 24. Thus, the magnetic disks 26 are mounted on the spindle hub 24 at fixed intervals. A disk clamp (not shown) is fastened to the spindle hub 24 to thereby clamp each magnetic disk 26 between the adjacent spacers 25 and fix each magnetic disk 26 to the spindle hub 24.

A shaft 30 is fixed to the base 22, and a carriage 32 is rotatably mounted through bearings 31 on the shaft 30. The carriage 32 includes a plurality of head arms 33 extending in substantially parallel relationship to the recording surfaces of the magnetic disks 26 and adapted to rotate in a direction crossing the tracks of the magnetic disks 26. A magnetic circuit 34 is provided at a corner portion of the housing 21. The magnetic circuit 34 is constructed of an outer yoke 35, an inner yoke 36 integrally formed with the outer yoke 35, and a plurality of permanent magnets 37 provided on an inside surface of the outer yoke 35 opposed to the inner yoke 36. A magnetic gap 38 is defined between the outer yoke 35 and the inner yoke 36.

A coil 39 is mounted on the carriage 32 opposite to the head arms 33 with respect to the shaft 30. The coil 39 is inserted in the magnetic gap 38. A head suspension mechanism 40 including a spring arm 51 and a gimbal 52 is fixed to each head arm 33 at a tip portion thereof. A magnetic head slider 41 for performing read/write of data from/to the recording surface of each magnetic disk 26 is mounted on the gimbal 52.

A first preferred embodiment of the magnetic head suspension mechanism according to the present invention will now be described with reference to FIGS. 3 to 6. A spacer 50 is fixed to the tip portion of the head arm 33 by caulking, screwing, etc. The spring arm 51 is fixed at a base portion thereof to the spacer 50 by spot welding to normally bias the magnetic head slider 41 toward the recording surface of the magnetic disk 26. A leaf spring portion 51a is formed in the vicinity of the base portion of the spring arm 51. A pair of reinforcing portions 51b for increasing rigidity are formed by bending the opposite side edges of the spring arm 51 except the leaf spring portion 51a so as to project in a direction perpendicular to the recording surface of the magnetic disk 26.

Figure 5:
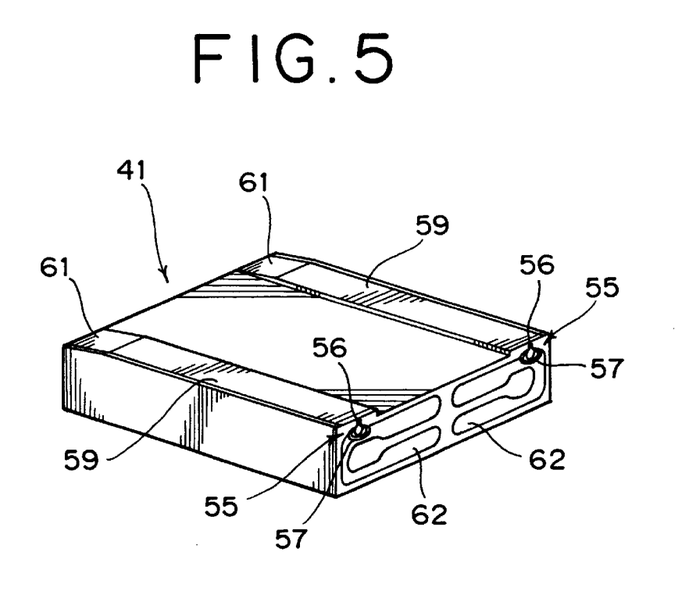
FIG. 5 is a perspective view of a slider provided in the head suspension mechanism shown in FIG. 3.

The gimbal 52 is fixed at a base portion thereof to a tip portion of the spring arm 51 by spot welding. The magnetic head slider 41 is fixed to a tip portion of the gimbal 52 by adhesive or the like. The slider 41 is configured as shown in FIG. 5. Two thin-film magnetic heads 55 as transducers are provided on one end surface of the slider 41; however, one of the two thin-film magnetic heads 55 is actually used. Each magnetic head 55 has a coil 57 and conductive pads 62 connected to the coil 57, and defines a magnetic gap 56.

A pair of rails 59 are formed on one surface of the slider 41 opposed to the recording surface of the magnetic disk 26 along the opposite side edges of the slider 41 so as to project toward the recording surface of the magnetic disk 26. Each rail 59 is formed at one end thereof with a tapering surface 61 for facilitating the entry of air flow to effect flying of the slider 41. Lead wires 63 are connected to the conductive pads 62 of the magnetic head 55 to be actually used. The lead wires 63 are inserted in a protective tube 64.

Figure 3:
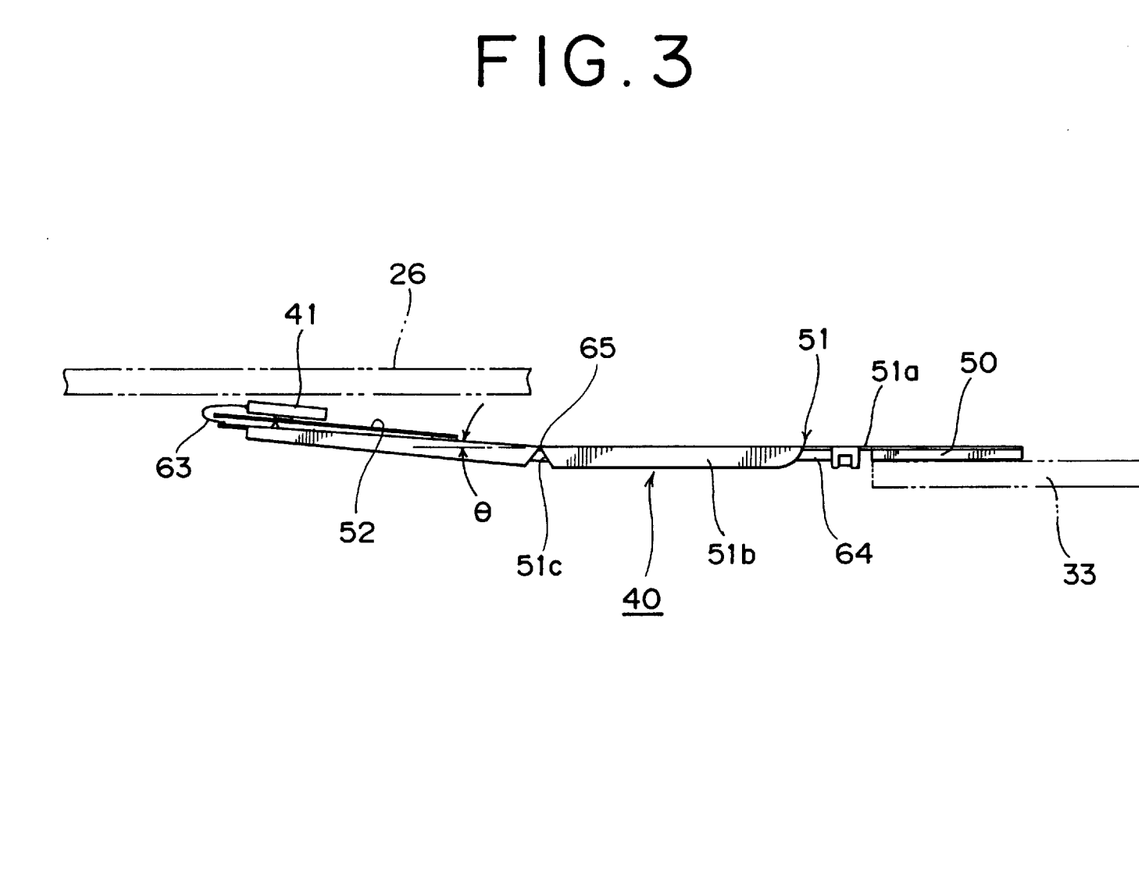
FIG. 3 is a side view of a first preferred embodiment of the head suspension mechanism according to the present invention.
Figure 4:
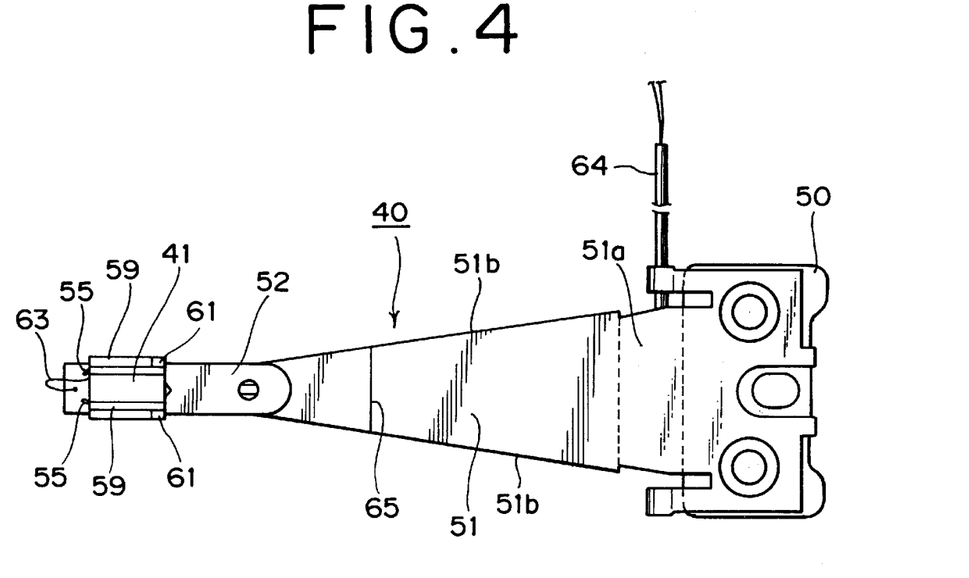
FIG. 4 is a plan view of the head suspension mechanism shown in FIG. 3.

As best shown in FIG. 3, a notch 51c is formed in each reinforcing portion 51b at a substantially middle position thereof, and as also shown in FIG. 4, a bent portion 65 is formed so as to connect both the notches 51c of the two reinforcing portions 51b. The spring arm 51 is bent at the bent portion 65 at an angle θ as shown in FIG. 3 so that the tip portion of the spring arm 51 approaches the recording surface of the magnetic disk 26. The bending angle θ in this preferred embodiment is set to about 1°.

In operation, when the magnetic disk unit is off, the slider 41 is kept in contact with the recording surface of the magnetic disk 26 by a biasing force of the spring arm 51. When the magnetic disk unit is turned on, each magnetic disk 26 is rotated at a high speed (e.g., 4,500 rpm) by the inner hub motor (not shown). The rotation of the magnetic disk 26 causes the generation of air flow, which then generates dynamic pressure. As a result, the slider 41 flies a very small distance from the recording surface of the magnetic disk 26 against the biasing force of the spring arm 51. When the coil 39 in the magnetic circuit 34 is excited, a thrust for rotating the carriage 32 is generated in the coil 39 to rotate each head arm 33 in a direction crossing the tracks of the magnetic disk 26 until the slider 41 is moved to reach a position over a target track. The gimbal 52 has a damper function to flexibly support the slider 41 with respect to the spring arm 51.

In writing data to the magnetic disk 26, a write signal current corresponding to write information flows into the coil 57 of the thin-film magnetic head 55 provided on the slider 41, and the write signal current is converted into a magnetic flux in a magnetic circuit (not shown), thus performing write of data to the recording surface of the magnetic disk 26 through the magnetic gap 56. In reading data from the magnetic disk 26, a current is generated in the coil 57 by a residual magnetic flux according to data recorded on the magnetic disk 26 through the magnetic gap 56 of the thin-film magnetic head 55, and data is reproduced according to the current value.

According to this preferred embodiment, the slider 41 is mounted so that the thin-film magnetic head 55 tilts as the transducer approaches the recording surface of the magnetic disk 26 by bending the spring arm 51 at the bent portion 65. Accordingly, the absolute value of the flying height of the slider 41 can be reduced, and furthermore, a good flying stability can be maintained.

Figure 6:
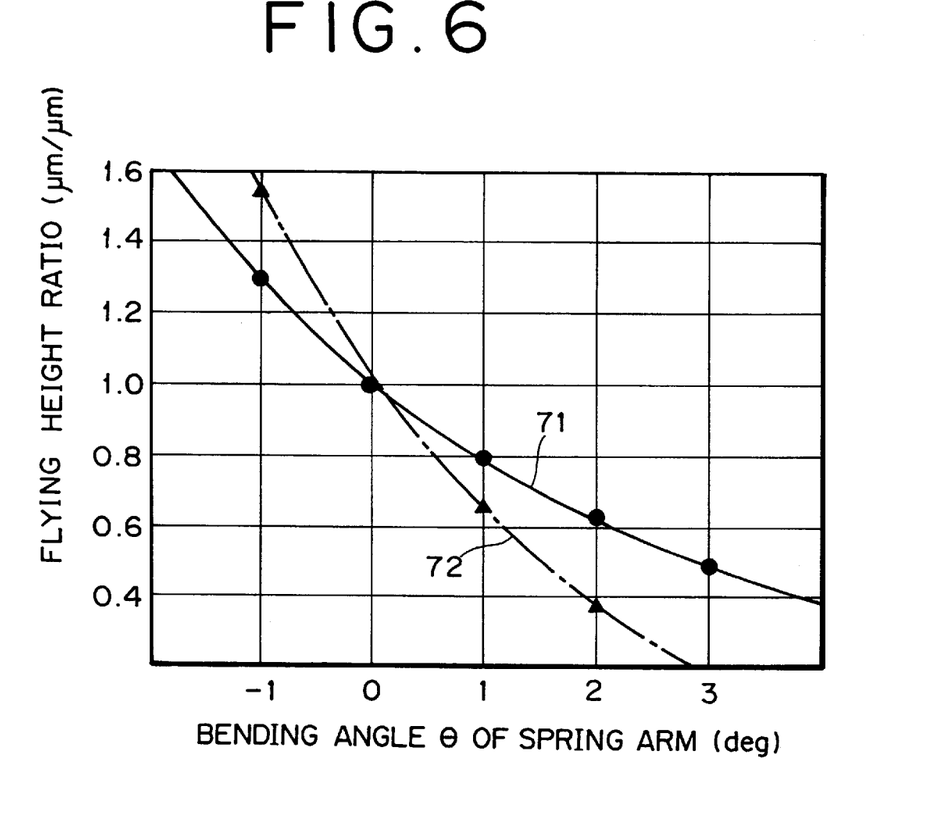
FIG. 6 is a graph showing a change in the ratio of the flying height of the slider at a bending angle $\theta$ of a spring arm to the flying height of the slider at the bending angle 0° with the bending angle $\theta$ varied.

Referring to FIG. 6, there is shown a graph illustrating a change in the ratio of the flying height of the slider at the bending angle θ to the flying height of the slider at the bending angle 0° with the bending angle θ varied. In FIG. 6, a curve 71 shows the flying height ratio when the peripheral speed of the magnetic disk 26 is about 10 m/s, which is a normal speed, while a curve 72 shows the flying height ratio when the peripheral speed of the magnetic disk 26 is increased to about 15 m/s. As apparent from FIG. 6, when the bending angle θ is set to +1°, the flying height of the slider is reduced about 20% from the flying height at the bending angle 0°. Further, when the peripheral speed is increased as in the curve 72, the change in the flying height ratio with respect to the bending angle θ of the spring arm 51 becomes large.

The trend in future magnetic disk units is to increase transfer speed by increasing rotational speed of the magnetic disks. Accordingly, the magnetic head suspension mechanism of this preferred embodiment is advantageous because the slider flying height can be reduced more with an increase in peripheral speed of the magnetic disks, and the flying stability can be improved. Further, as apparent from FIG. 6, it is preferable that the bending angle θ of the spring arm 51 is to be set to the range of about 1° to about 2°, so as to attain low flying of the slider 41.

Figure 7:
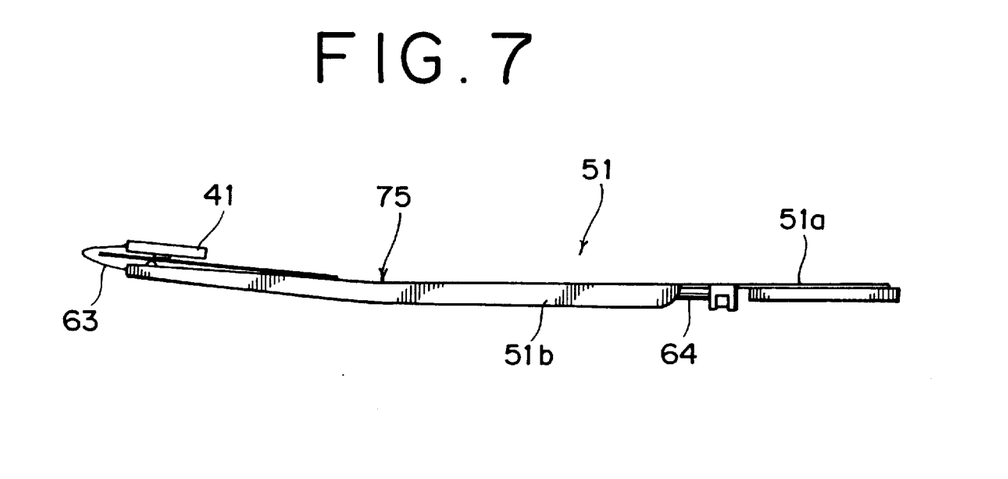
FIG. 7 is a side view of a second preferred embodiment of the head suspension mechanism according to the present invention.

Referring next to FIG. 7, there is shown in side elevation a second preferred embodiment of the head suspension mechanism according to the present invention. In the following description of the second preferred embodiment, substantially the same parts as those of the first preferred embodiment shown in FIGS. 3 and 4 will be denoted by the same reference numerals, and the explanation thereof will be omitted to avoid duplication. The second preferred embodiment differs from the first preferred embodiment in the point that no notches are formed in the reinforcing portions 51b of the spring arm 51, and the spring arm 51 is bent at a bent portion 75 at a predetermined angle so that the tip portion of the spring arm 51 approaches the recording surface of the magnetic disk 26. The second preferred embodiment can exhibit an effect similar to that obtained in the first preferred embodiment.

Figure 8:
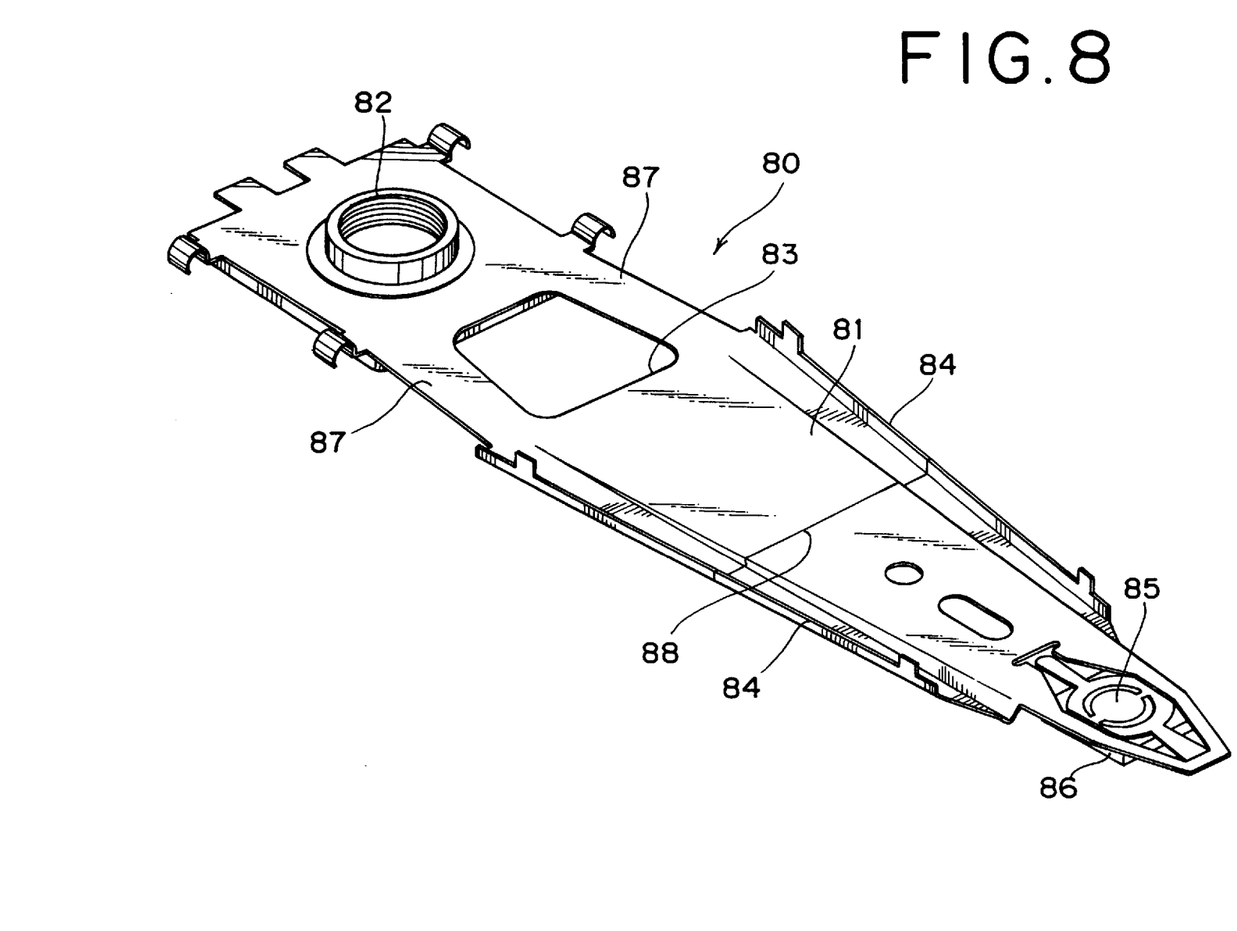
FIG. 8 is a perspective view of a third preferred embodiment of the head suspension mechanism according to the present invention.

Referring to FIG. 8, there is shown in perspective a third preferred embodiment of the head suspension mechanism according to the present invention. Reference numeral 80 generally designates a head suspension mechanism including a spring arm 81 and a gimbal 85 integrally formed with the spring arm 81 at a tip portion thereof. The spring arm 81 is formed at its base portion with a cylinder 82 to be engaged with a hole formed at a tip portion of a head arm (not shown in FIG. 8). The spring arm 81 is fixedly mounted on the head arm by caulking the cylinder 82. An opening 83 is formed through the spring arm 81 in the vicinity of the cylinder 82, thereby forming a pair of spring portions 87 with a reduced rigidity around the opening 83.

A pair of reinforcing portions 84 for increasing rigidity are formed along the opposite side edges of the spring arm 81 in the range between the opening 83 and the tip portion of the spring arm 81. The gimbal 85 is integrally formed with the spring arm 81 at the tip portion thereof by electric discharge machining, etching, etc. A magnetic disk slider 86 for performing read/write of data from/to the recording surface of a magnetic disk (not shown in FIG. 8) is mounted on the gimbal 85. This gimbal 85 allows the slider 86 to tilt in any direction. The spring arm 81 is bent at a bent portion 88 at a predetermined angle so that the slider 86 approaches the recording surface of the magnetic disk. The third preferred embodiment can also exhibit an effect similar to that obtained in the first preferred embodiment.

Figure 9:
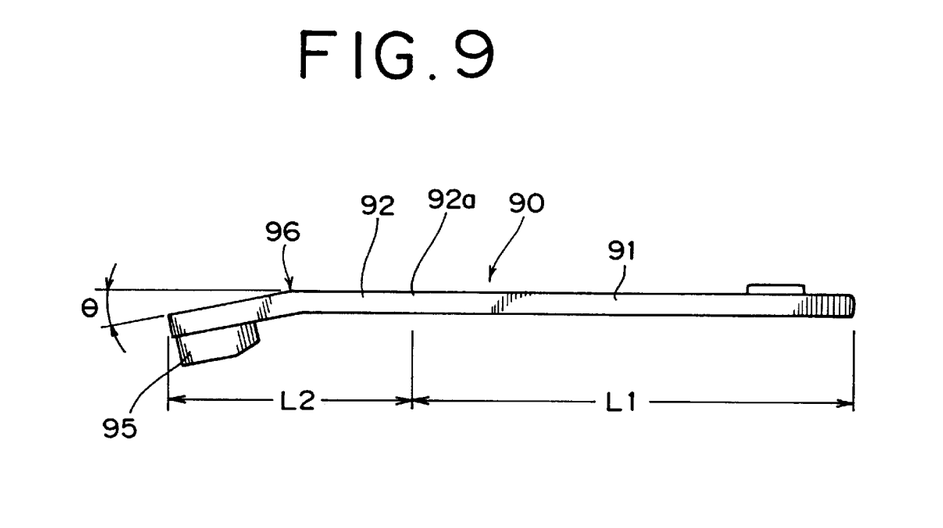
FIG. 9 is a schematic side view of a fourth preferred embodiment of the head suspension mechanism according to the present invention.
Figure 10:
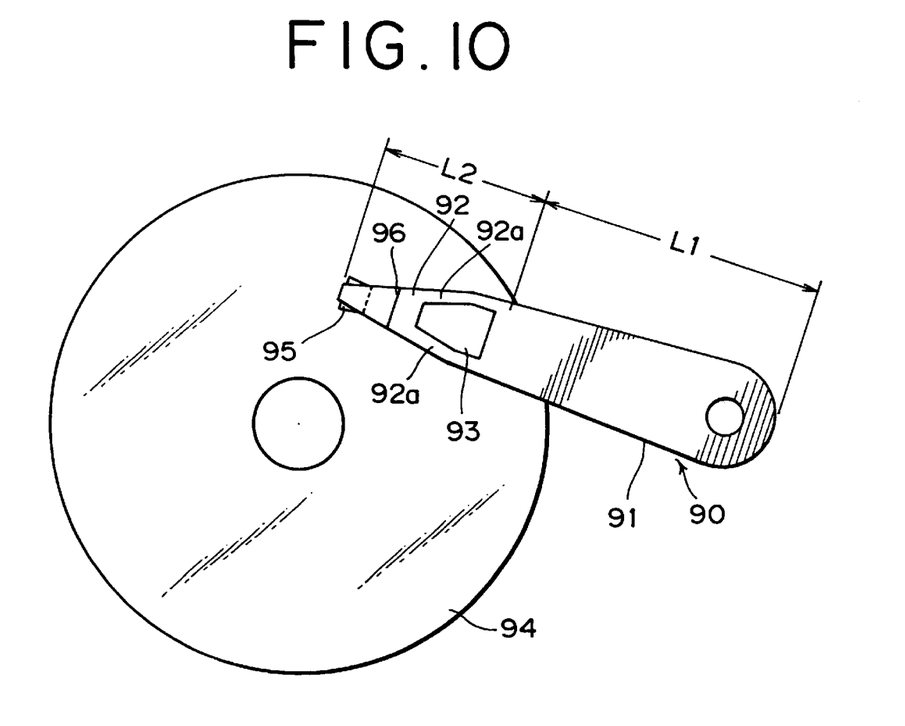
FIG. 10 is a schematic plan view of the head suspension mechanism shown in FIG. 9.

Referring to FIGS. 9 and 10, there is shown a fourth preferred embodiment of the head suspension mechanism according to the present invention. Reference numeral 90 generally designates a head suspension mechanism including a head arm portion 91 and a spring arm portion 92 integral with the head arm portion 91. This integral structure is advantageous in a compact magnetic disk unit. In FIGS. 9 and 10, the head arm portion 91 is shown by a range L1, and the spring arm portion 92 is shown by a range L2. As shown in FIG. 10, an opening 93 is formed through the spring arm portion 92 at a base portion thereof, thereby forming a pair of spring portions 92a with a reduced rigidity around the opening 93. A magnetic disk slider 95 for performing read/write of data from/to the recording surface of a magnetic disk 94 is mounted on the spring arm portion 92 at a tip portion thereof. The spring arm portion 92 is bent at a bent portion 96 at an angle θ so that the slider 95 approaches the recording surface of the magnetic disk 94. The bending angle θ is set to the range of preferably about 1° to about 2°. Furthermore, the bent portion 96 is formed preferably in the vicinity of the tip portion of the spring arm portion 92. The fourth preferred embodiment can also exhibit an effect similar to that obtained in the first preferred embodiment.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A magnetic disk unit comprising:

a housing having a base and a cover;

a magnetic disk rotatably mounted in said housing and having a plurality of circular tracks on a recording surface;

a magnetic head slider for supporting a transducer in proximity to said rotating magnetic disk, said transducer performing read/write of data from/to said magnetic disk;

a spring arm having one end portion for supporting said slider, a leaf spring portion provided in the vicinity of an other end portion for biasing said slider toward said magnetic disk and a bent portion located between said one end portion and said leaf spring portion and spaced from said leaf spring portion, said spring arm further having first and second flat portions between said one end portion and said leaf spring portion and first and second pairs of reinforcing portions, each pair being formed by bending the opposite side edges of said first and second flat portions, respectively, said bent portion being formed between said first flat portion and said second flat portion so that said transducer mounted on said slider approaches and is inclined toward said magnetic disk, said transducer being mounted on a surface of said slider which is at a bending angle to a plane perpendicular to said recording surface;

a gimbal having a base portion mounted on said one end portion, said slider being mounted on said gimbal; and carriage means connected to said other end portion of said spring arm for moving said slider supported to said spring arm in a direction crossing the tracks of said magnetic disk.

2. The magnetic disk unit according to claim 1, wherein said bending angle at said bent portion of said spring arm is set to a range of about 10° to about 2°.

3. The magnetic disk unit according to claim 2, wherein said carriage means has a head arm rotatably mounted on said base, and said other end portion of said spring arm is fixed to a tip portion of said head arm.

4. The magnetic disk unit according to claim 3, wherein said head arm is integrally formed with said spring arm.

5. The magnetic disk unit according to claim 1, wherein said bent portion of said spring arm is formed in the vicinity of said one end portion of said spring arm.

6. The magnetic disk unit according to claim 1, wherein said slider is mounted on a tip portion of said gimbal.

7. The magnetic disk unit according to claim 1, wherein said gimbal is integrally formed with said one end portion.

8. The magnetic disk unit according to claim 1, wherein said bent portion of said spring arm is formed in the vicinity of said one end portion of said spring arm and said bending angle is set to about 1°.

\* \* \* \* \*

UNITED STATES PATENT AND TRADEMARK OFFICE
CERTIFICATE OF CORRECTION

PATENT NO. : 5,835,307
DATED : November 10, 1998
INVENTOR(S) : Katsuhide Sone

It is certified that error appears in the above-identified patent and that said Letters Patent is hereby corrected as shown below:

Column 6, line 46, delete "10°" and insert

--1°-- therefor

Column 4, line 46, delete "6" and insert --θ-- therefor

Signed and Sealed this

Fifth Day of October, 1999

Attest:

Q. TODD DICKINSON

*Attesting Officer*  *Acting Commissioner of Patents and Trademarks*